United States Patent
Mishra et al.

(10) Patent No.: US 12,484,114 B2
(45) Date of Patent: *Nov. 25, 2025

(54) HYBRID BASE STATION AND RRH

(71) Applicant: Parallel Wireless, Inc., Nashua, NH (US)

(72) Inventors: Rajesh Kumar Mishra, Westford, MA (US); Steven Paul Papa, Windham, NH (US); Kaitki Agarwal, Westford, MA (US); Randy Rutherford, Bedford, NH (US); David Johnston, Nashua, NH (US); Christopher Simmonds, Andover, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/515,144

(22) Filed: Nov. 20, 2023

(65) Prior Publication Data

US 2024/0090082 A1 Mar. 14, 2024

Related U.S. Application Data

(63) Continuation of application No. 16/782,057, filed on Feb. 4, 2020, now Pat. No. 11,825,563.

(Continued)

(51) Int. Cl.
*H04W 88/08* (2009.01)
*H04B 7/024* (2017.01)
(Continued)

(52) U.S. Cl.
CPC .......... *H04W 88/085* (2013.01); *H04B 7/024* (2013.01); *H04B 10/25753* (2013.01);
(Continued)

(58) Field of Classification Search
CPC ............. H04B 7/024; H04B 10/25753; H04W 88/085; H04W 24/02; H04W 48/08; H04W 92/14
See application file for complete search history.

(56) References Cited

U.S. PATENT DOCUMENTS 11,825,563 B2 * 11/2023 Mishra ................... H04B 7/024
2011/0310941 A1 * 12/2011 Kenington .......... H04W 88/085
375/220

(Continued)

OTHER PUBLICATIONS

"Ethernet-based C-RAN Fronthaul"; Marques; 2018 (Year: 2018).*

*Primary Examiner* — Benjamin H Elliott, IV
(74) *Attorney, Agent, or Firm* — Michael Y. Saji (57) ABSTRACT

Systems, methods and computer software are disclosed for providing base station and Remote Radio Head (RRH) functionality. In one embodiment, a method is disclosed, the method for providing base station and Remote Radio Head (RRH) functionality in a base station, comprising: providing a baseband card; providing a radio head, the radio head coupled to the baseband card by way of an interface; and switching, under the control of a processor, between use of the baseband card and use of an external baseband unit for controlling the radio head, the external baseband unit used via a Common Public Radio Interface (CPRI) port, thereby providing dual base station and remote radio head functionality.

20 Claims, 8 Drawing Sheets

Related U.S. Application Data

(60) Provisional application No. 62/801,032, filed on Feb. 4, 2019.

(51) Int. Cl.
  *H04B 10/2575* (2013.01)
  *H04L 5/00* (2006.01)
  *H04W 24/02* (2009.01)
  *H04W 48/08* (2009.01)

(52) U.S. Cl.
  CPC ........... *H04L 5/0032* (2013.01); *H04W 24/02* (2013.01); *H04W 48/08* (2013.01)

(56) References Cited

U.S. PATENT DOCUMENTS

| | | | |
|---|---|---|---|
| 2013/0017852 A1* | 1/2013 | Liu | H04W 88/085 455/507 |
| 2013/0203405 A1* | 8/2013 | Norman | H04W 24/00 455/424 |
| 2016/0233951 A1* | 8/2016 | Tsuji | H04B 7/15557 |
| 2017/0202006 A1* | 7/2017 | Rao | H04W 72/542 |
| 2017/0257133 A1* | 9/2017 | Papa | H04B 7/0413 |
| 2017/0324454 A1* | 11/2017 | Merkel | H04B 7/0617 |
| 2017/0353237 A1* | 12/2017 | Johansson | H04L 7/0075 |
| 2018/0220312 A1* | 8/2018 | Guttenfelder | G01S 19/23 |
| 2018/0242167 A1* | 8/2018 | Bottari | H04W 28/16 |
| 2020/0252996 A1* | 8/2020 | Mishra | H04W 24/02 |
| 2024/0090082 A1* | 3/2024 | Mishra | H04W 24/02 |

* cited by examiner

HYBRID BASE STATION AND RRH

CROSS-REFERENCE TO RELATED APPLICATIONS

This application is a continuation of U.S. application Ser. No. 16/782,057, filed Feb. 4, 2020, which claims priority under 35 U.S.C. § 119(e) to U.S. Provisional Pat. App. No. 62/801,032, filed Feb. 4, 2019, titled "Hybrid Base Station and RRH," each of which is hereby incorporated by reference in its entirety for all purposes. This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

A Converged Wireless System (CWS) is a multi-RAT base station with 3G, LTE/4G, 5G and Wi-Fi technologies that provides a flexible outdoor and in-vehicle solution in conjunction with a coordination node, variously known as a radio access network controller (RAN controller), radio access network intelligent controller (RIC), aggregator, coordination node, or Parallel Wireless Heterogeneous Network Gateway (HNG). The combined system is a cloud-based network orchestration system that maximizes virtualization, and functions to bring 3G, LTE/4G, 5G and Wi-Fi operators better technology at lower cost. The combination of the HNG and the CWS addresses key challenges in delivering coverage, capacity, and quality of service (QoS), regardless of the cell size, e.g., femtocell, pico cell, micro cell, metro cell, or macro cell. In some embodiments, the CWS may be a multi-RAT base station with Wi-Fi and LTE access capability; integrated flexible backhaul including line of sight (LOS) and non-line of sight, fiber, Ethernet, and LTE backhaul; multi-radio multipoint-to-multipoint wireless mesh capability; control, security and traffic prioritization capability; self-organizing network (SON)-based interference mitigation for superior subscriber experience and dynamic RF power adjustments.

Some base stations are designed as all-in-one devices, but customer demand is not one-size-fits-all. As demands increase, hard to swap out the baseband card. Future upgradeability is a requirement, including for 5G. There is also substantial market demand for remote radio heads of various types, as well as various splits of baseband processing, from full baseband processing at the base station to centralized baseband processing (CRAN or "baseband hotel") to distributed or aggregated baseband processing schemes of various types. Baseband can be processed outside of the base station as long as radio samples are able to be transported and processed within a latency budget that is the consequence of standards set by the radio access technology (RAT), e.g., 2G/3G/4G/5G/Wi-Fi/etc.

SUMMARY

Systems, methods and compute readable medium instructions for providing base station and Remote Radio Head (RRH) functionality in a base station are described. In one embodiment, a method may be disclosed for providing base station and Remote Radio Head (RRH) functionality in a base station. The method includes providing a baseband card; providing a radio head, the radio head coupled to the baseband card by way of an interface; and wherein the radio head includes a Common Public Radio Interface (CPRI) enabling use of the base station as a remote radio head, thereby providing dual base station and remote radio head functionality.

In another embodiment, a system may be disclosed, the system including a baseband card; a radio head, the radio head coupled to the baseband card by way of an interface; and wherein the radio head includes a Common Public Radio Interface (CPRI) enabling use of the base station as a remote radio head, thereby providing dual base station and remote radio head functionality.

In another embodiment, a non-transitory computer-readable medium is disclosed, the computer readable medium containing instructions for providing base station and Remote Radio Head (RRH) functionality in a base station, which, when executed, cause a base station to perform steps comprising: providing a baseband card; providing a radio head, the radio head coupled to the baseband card by way of an interface; and wherein the radio head includes a Common Public Radio Interface (CPRI) enabling use of the base station as a remote radio head, thereby providing dual base station and remote radio head functionality.

DETAILED DESCRIPTION

An exemplary design includes a baseband card sharing an enclosure with a radio head, wherein the radio head is coupled to the baseband card via any proprietary or standard interface. The radio head also has a standard CPRI interface, enabling a CPRI passthrough. Enabling a CPRI connection to the radio head allows the device to operate functionally as a RRH, giving it dual base station and RRH functionality.

Figure 1:
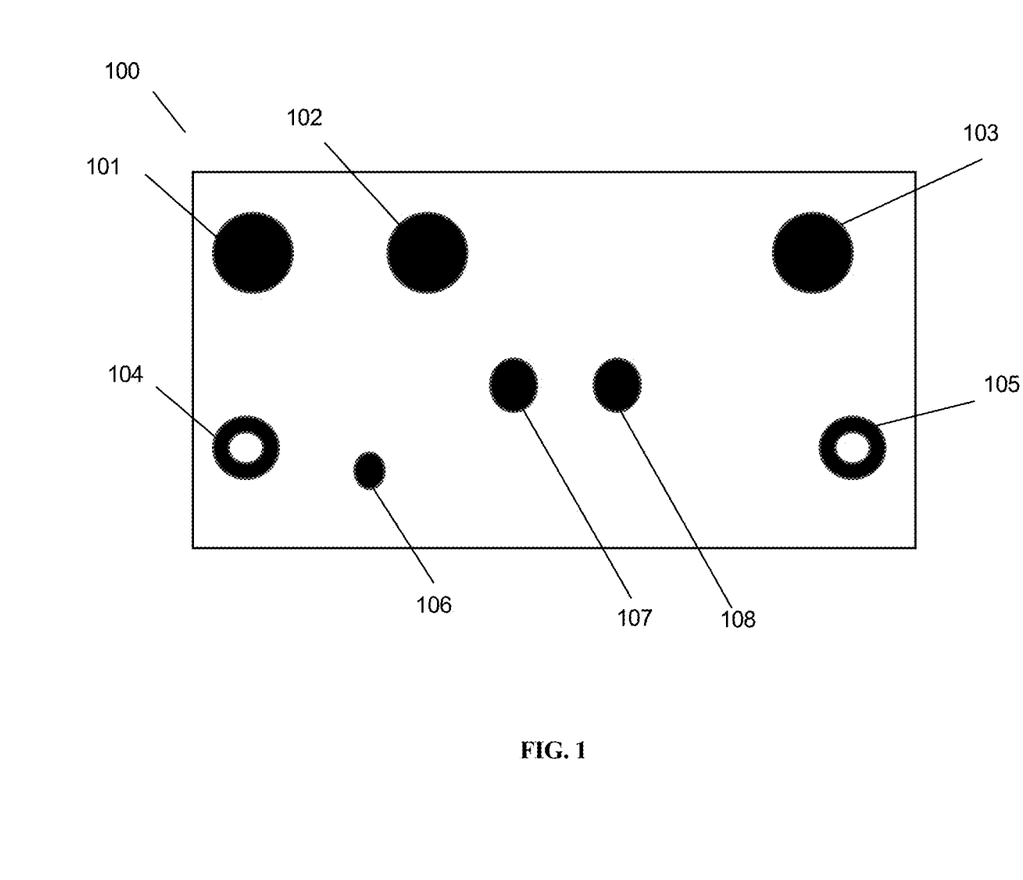
FIG. 1 is a block diagram showing the connectors on a base station, in accordance with some embodiments.

FIG. 1 is a block diagram showing the connectors on a base station, in accordance with some embodiments. Referring to FIG. 1, a block diagram rear view of a CWS base station providing base station and RRH functionality 100 is shown. The CWS includes a power connector 101, a Small Form Factor Pluggable (SFP) port 102, an RJ45 connector for Power Over Ethernet (POE) 103, a first antenna port 104, and a second antenna port 105. Also shown is an alarm port 106 and Antenna Interface Standards Group (AISG) connectors 107 and 108. Port 103 can be used for backhaul via SFP. However, port 103 can also be replaced and/or turned into a CPRI passthrough for an external BBU, in some embodiments. SFP is a pluggable module with a cage, with a light to electrical transducer. Connects to internal Ethernet switch. SFP is 1.25 G SERDES; SFP+ is a variant of SFP with 10 Gbps performance.

Thus, as shown in FIG. 1, there is potential to replace the RJ45/POE with a second SFP. Would be able to run a second fiber down from the CWS, so that there was the capability to do a future expansion to a BBU (example: CPRI). A disadvantage with this approach is you lose both the RJ45 and the POE, so cannot easily plug in a BHM. Additionally, have an extra "dark" fiber that may or may not work, when needed. We can retain the RJ45/POE and just use a single SDFP for Ethernet backhaul or CPRI (one at a time).

As known in the art, the CPRI protocol enables transfer of I/Q data (samples) for radio, using 15-bit words. CPRI also adds: Control commands ("turn TX up" or "give me RSSI"), timing (start stop, frame boundaries) and clocking (Frequency band is controlled by clocking accuracy; critical since I/Q is time domain data). CPRI is carried at line rate of underlying PHY. CPRI is a master-slave interface. Master provides clocking, typically with GPS clock disciplining. 4.1952 Gbps is fast enough to provide 2X2 T2R @ 30.72 samples per sec (20 MHz band), e.g., 2 LTE carriers. eCPRI sends no I/Q, sends commands. Where the word CPRI is used herein, it is understood that eCPRI or another equivalent protocol may also be substituted therein.

CPRI versus Ethernet. CPRI does its own framing, does not use Ethernet PHY. Auto-detect Ethernet or CPRI based on signals on the chip. CPRI sends whole frame, and it will be decoded at the CPRI receiving end.

Overview of CPRI processing. I/Q samples are digitized at DAC. FPGA creates CPRI frame. Send CPRI signal out via SFP port to BBU. External BBU processes it.

CPRI processing is well-known, but the use of it in a hybrid approach is not. As well, the auto-detect is not known. This arrangement enables flexible RAN splits a 1a 5G deployment models. Full base station or RRH or both.

There is a way to "autodetect" whether a fiber is connected to a BBU (CPRI) or to an Ethernet device (example a muter). When SFP+ port is connected to an Ethernet switch—in this case it is an ethernet backhaul connection, and it is connected to the Ethernet switch onboard. When SFP+ port is connected to BBU—it is a CPRI connection, and connected to the FPGA. When in this configuration, the CPRI control channel can be muted back to the onboard Ethernet switch to provide backhaul.

The present disclosure contemplates at least the following scenarios:

A base station with baseband card. May be a multi-RAT base station, e.g., 2G+4G, or 3G+4G, or any other combination. RATs could include: 2G/3G/4G/5G/Wi-Fi, others. May include hardware accelerators, e.g., FPGA, DPDK etc, for performing processing of the RATs. Radio includes CPRI input and direct input for baseband card.

A remote baseband unit coupled to the CPRI input. Could be located at the bottom of the tower, in a cabinet. Could be used to provide another RAT, e.g., if baseband card provides 2G+4G, the R-BBU could provide 3G. R-BBU could provide high-end features and expandability: carrier aggregation, CoMP, etc. Could be located further from the tower as well, as long as latency requirements are met.

A switchable version of the above two embodiments, which may be referred to as hybrid, such that eBBU/rBBU functionality is available and may be turned on via software or hardware switching. In some embodiments, it may be decided by the telecom operator which radio interfaces and radio technologies are supported by a baseband processor at the base station itself versus in a remote baseband or external baseband.

In some embodiments, multiple basebands coupled to a single radio are generally contemplated. In some embodiments, multiple basebands that use switchable ports between CPRI and Ethernet are contemplated. In some embodiments, switching one or more ports as needed between CPRI for external BBU and Ethernet backhauling based on performance needs is contemplated.

Hybrid base station/radio head is thus the best of both worlds. Switchable to act as one or the other. Upgradable capability based on what is plugged into the CPRI port. RJ45 is cheaper than a copper SFP. Base station can provide PoE. Install once, with single fiber run. Subsequently upgrade from Ethernet backhaul to CPRI. Saves fiber run and ensures that fiber works when you go to upgrade to CPRI. Form factor can be similar to other small cells and small macro cells.

Figure 2A:
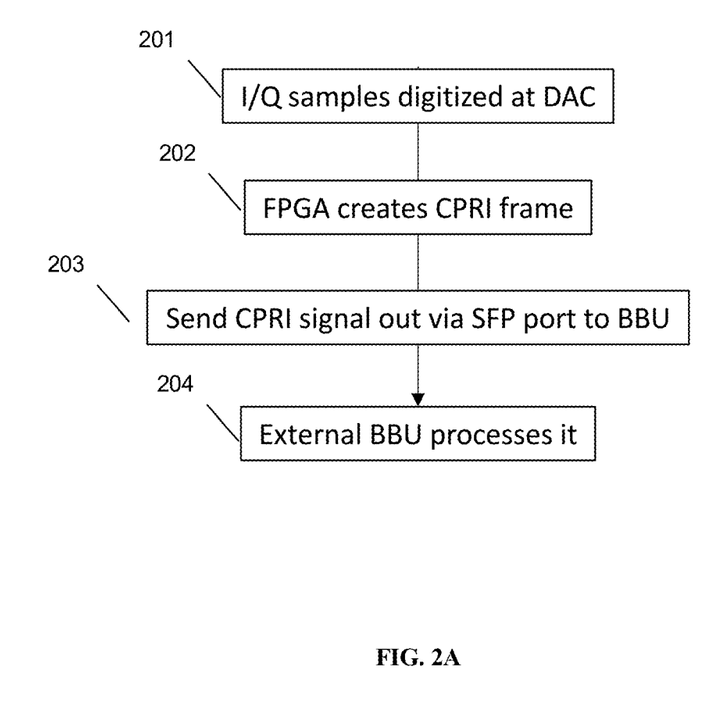
FIG. 2A is a flowchart depicting a process for utilizing an external baseband unit, in accordance with some embodiments.

FIG. 2A is a flowchart depicting a process for utilizing an external baseband unit, in accordance with some embodiments. At step 201, I/Q samples are digitized at a DAC. At step 202, a processor, which may be a FPGA, creates the CPRI frames. At step 203, this CPRI signal is sent out via the SFP port to the external BBU. At step 204, the external BBU processes it.

Figure 2B:
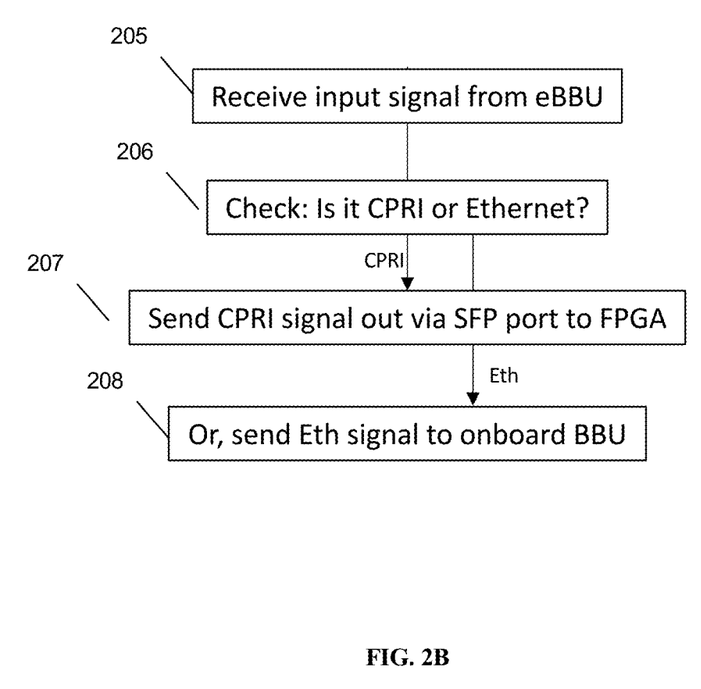
FIG. 2B is a flowchart depicting a process for switching between two external BBU input signals, in accordance with some embodiments.

FIG. 2B is a flowchart depicting a process for switching between two external BBU input signals, in accordance with some embodiments. At step 205, an input signal is received by the base station. At step 206, a relatively fast processor capable of handling either CPRI or Ethernet frames at an appropriate bandwidth is employed to determine whether this input signal appears to be CPRI or Ethernet; these protocols are different enough that this is a simple task. If CPRI is found, this CPRI signal may be sent out via an SFP port to the radio directly, or, in some embodiments, if another FPGA is present to provide additional functionality such as crest factor reduction (CFR) or digital pre-distortion (DPD), the CPRI signal may be passed to that chip. If Ethernet is found, the system may make the determination that these are not radio samples, and that the input signal should be sent to a baseband processor that is located onboard.

Figure 3:
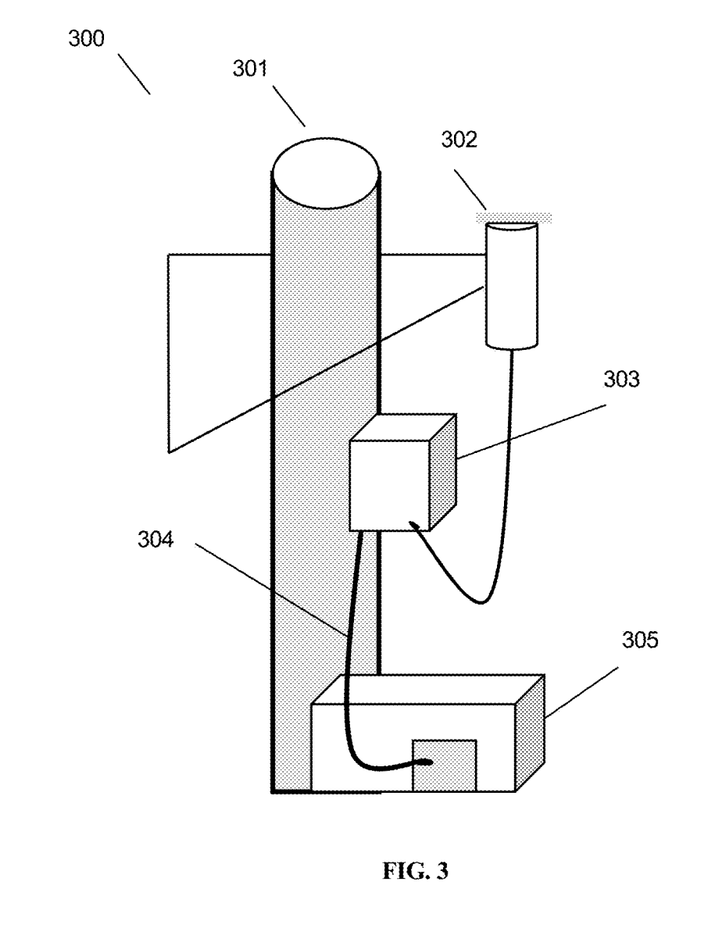
FIG. 3 is a block diagram showing the system including an antenna, radio head, and baseband unit, in accordance with some embodiments.

FIG. 3 is a diagram showing a system 300 having a mast 301 with an antenna 302 disposed on the mast. While only a single antenna is shown, it should be appreciated that multiple antennas may be used. Also shown is a radio head 303 in communication with antenna 302. A baseband unit 305 is shown disposed remote from the radio head 303 and in communication with the radio head 303 by way of CPRI connection 304.

There may be a condition when the signal when both the BBU (connected via CPRI) and the baseband card are overlaid. These do not get put on the same bus at the same time. If they were to get put on the same bus, they have different framing. Autodetect will detect which frames are which and can optionally send different frames to different targets.

CWS with local baseband capability that can run a multi-RAT architecture, including 5G, but that can also work as a split architecture where some of the processing stack can move "down the stack" to a BBU in some circumstances, or can also act as a pure remote radio head without base station functionality.

Various combinations of BBU processing are contemplated, up to and including being able to fully and dynamically mix and match RRH and BS for each RAT. For example, this enables upgradability from one "G" to another "G" by adding hardware BBU; and upgradability by adding external offload capability, thereby enabling the base station portion to provide additional capability (e.g., BBU provides 3G offload, BS now available to provide 2G/4G).

Figure 4:
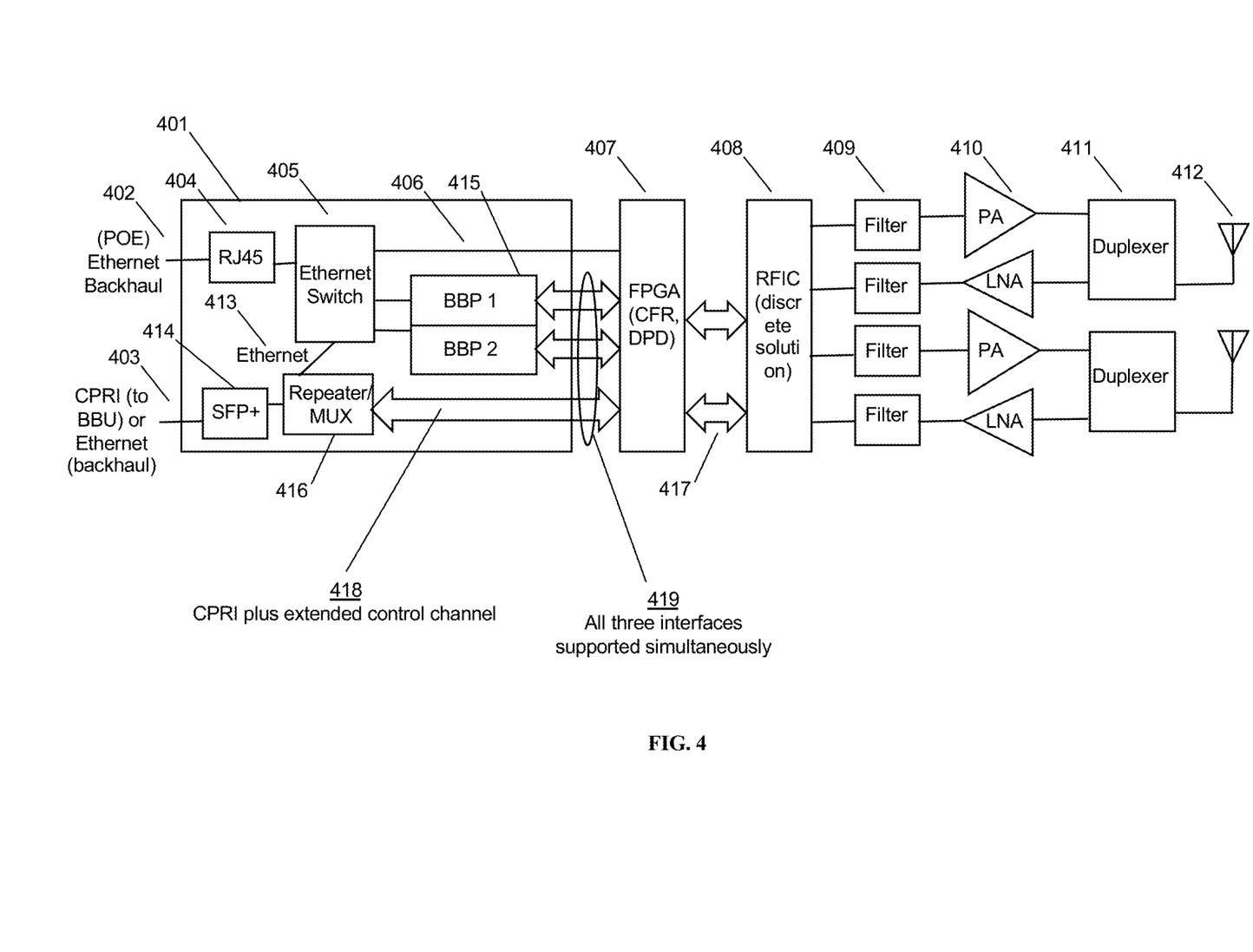
FIG. 4 is a block diagram showing processing components, in accordance with some embodiments.

FIG. 4 is a block diagram showing processing components, in accordance with some embodiments. Base station 401 includes PoE Ethernet port 402, coupled to RJ45 interface 404, which is coupled to an internal Ethernet switch 405. An additional CPRI (to BBU) or Ethernet (switchable) port 403 is also provided, coupled to an SFP+ interface 414. A repeater/mux 416 is used to perform switching either between the internal Ethernet switch 405 or the radio support FPGA 407, depending on the type of input signal, as described herein.

The Ethernet switch 405 is also coupled to onboard baseband processors 1 and 2, denoted 415. The baseband processors utilize Ethernet backhaul 402 via the switch, and perform baseband processing for one or more carriers using one or more radio access technologies, e.g., 2G/3G, 2G/4G, 3G/4G, 4G/4G, and output radio samples to the radio, which first passes through the radio support FPGA 407. In some embodiments the Ethernet switch is also directly coupled to the radio support FPGA 407.

The radio support FPGA 407 performs various functions that improve the performance of the radio, however, after the radio signal has been created digitally. For example, crest factor reduction (CFR) and digital pre-distortion (DPD) are contemplated. As these are processor-intensive, an FPGA or other ASIC may be used.

The output of this FPGA 407 goes to the radio, here labeled RFIC 408. This is a digital radio and may be a discrete solution. The radio generates the radio signals and puts them into the RF transmit chain (or receives from the RF receive chain), consisting of power amplifiers and low noise amplifiers 410, and, duplexers 411, finally terminating in antennas 412.

Radio access technology/Access Mode Technology (Access): 2G/3G/4G/5G. The present disclosure can be used to support the PW "any G" concept, as applicable to the band of operation of the CWS radio the internal baseband or external baseband is integrated with. By swapping out the external baseband using CPRI, any G can be supported, in conjunction with the internal baseband, which may supply baseband processing at a minimum for 4G/4G, 2G/4G, or 3G/4G in some embodiments. This is particularly relevant as 2G physical layer processing can be performed without overly intensive processing resources and therefore is a good candidate to be performed at the onboard BBU. Note: 2G is relevant to 3GPP Bands 2, 3, 5, 8.

Band(s) Supported (Backhaul): Band agnostic; the baseband card can support any CWS 3GPP band TDD or FDD.

Technology Standard: 3GPP Release 11 and higher, etc. All requirements of this standard to be met as a minimum unless otherwise stated.

MIMO (LTE): 2×2, HW Ready to support 2×2 MIMO LTE/4G or above. Assumes capability at the UE is matched for this mode of operation.

Carriers (Tx 2G/3G/4G/5G): Multiple carriers for each G can be supported.

All Carrier Combinations for Multi-RAT are contemplated.

Number of Users is dependent on the system configuration e.g. if internal (embedded processor) or external BBU.

CPRI Backhaul shall be supported and shall support fiber data connection running CPRI. Note: some customization may be required for backhauling.

CPRI Line Rate: Rate 5, At least 4.9152 Gbps to be supported. Note: CPRI rate 5 supports 4×20 MHz LTE A×C.

CWS backhaul over CPRI—In CPRI mode the CPRI control channel may be routed back to the internal Ethernet switch to provide backhaul to the CWS.

Multiple CPRI lanes could be used. CPRI lanes could be dedicated to different RATs.

Small Form-Factor Pluggable (SFP) Detect Function: Card shall detect and be able to report the fitted SFP to ensure it is compatible/fit for purpose Card may be able to determine the type of SFP fitted and assess some or all of the following parameters: SFP Type/Manufacturer, Serial Number, Temperature; Data Rate/Capability. Interface with SFP shall be supported Interface (e.g. I2C) for allowing interrogation of the SFP type and functions.

Backhaul CPRI. CPRI Auto-detect-to auto-detect whether a fiber connection is CPRI and hence adapt to use CPRI as Backhaul.

CPRI synchronization to be used when in CPRI mode. Note: 1588 is not a function of the hybrid BS. GPS not relevant to CPRI. In backhaul mode it goes to the FPGA not main processor.

Fiber Input SFP: Shall support SFP (small form-factor pluggable transceiver). For use in the CWS the physical interface shall remain the same.

Fiber Input SFP+: Shall support SFP+(enhanced small form-factor pluggable transceiver). For use in the CWS with same form factor as SFP.

Ethernet Backhaul: Shall be supported. Shall support fiber data connection running Ethernet up to 1 Gbps.

Backhaul Ethernet. Ethernet Auto-Detect-to auto-detect whether a fiber is Ethernet and hence shall adapt to use Ethernet as Backhaul.

PoE+ Connector: RJ45 Uses the RJ-45 connector.

PoE+ Power Output: Through PoE Connector.

PoE+: 802.3at From RJ-45 data connector for powering local ancillary equipment e.g. PW BHM.

Any number of CPRIs could be supported. JESD buses could be supported. An external BBU may be higher power (could use more electricity but could also have more compute), and could provide 5G, CoMP, carrier aggregation, high user count, or other high performance capabilities, making such a radio head future proof.

Optical module can handle either CPRI or Ethernet.

External BBUs would have their own backhaul. Onboard BBUs would also need backhaul.

Further details are provided regarding the implementation of CPRI/Ethernet switching. 1. Serializer/deserializer (SERDES) mux listens to signal. Start with Eth, wait for link to come up, ask switch if link is up (Wait 5 secs to acquire signal). Alternately, CPU can also give us a "Link Up" signal. Ask SFP+: Is module plugged in? . . . Is the light on? If we can't decide we could just send the signal to both ETH and CPRI.

We discriminate between CPRI signals using clock, then timing, then control messages. We discriminate ETH using link status. Can also use Retirement chip with mux or a 3-position high speed switch. Logic can be in software on main CWS processor.

In some embodiments, various other uses for the flexible CPRI port are envisioned. Specifically, centralized unit (CU), distributed unit (DU), as well as remote unit (RU) splits are contemplated by 3GPP. These radio functional splits can be utilized by 4G and 5G according to the specification. However, the present disclosure enables these splits for other RATs, like 2G and 3G. Any functional split can be enabled using a combination of onboard baseband and remote or external baseband, for any RAT, even 2G or 3G.

In some embodiments, a larger number of flexible and switchable CPRI ports is contemplated. For example, 3 (or any other number) switchable ports could be used, and 3 (or any other number) of onboard baseband units could be used. In such an embodiment, 3 onboard baseband units could be used for low-capacity 4G at a low-usage time, and then all 3 onboard baseband units could be powered off at a high-capacity or high-usage time in favor of external baseband units. In another example, 4G could be switched for 5G and vice versa in certain situations and environments, such as high-capacity versus high-coverage situations. In some embodiments the logic for whether to switch between onboard baseband and external baseband may reside in a combination of: onboard; at the external baseband; at the coordinating server; at the core network. Signaling may be used to perform coordination of turning certain baseband modules on or off. More than one external baseband may be supported. External baseband processors may reside at the base of the tower or may be cloud-based and may be virtualized, with the only constraint to their physical locality being latency for the radio samples to make it back to the radio head in time to meet the requirements of the specific RAT. This means, for example, that 2G and 3G, which have lesser latency requirements, may be handled by external basebands at a centralized data center.

Figure 5:
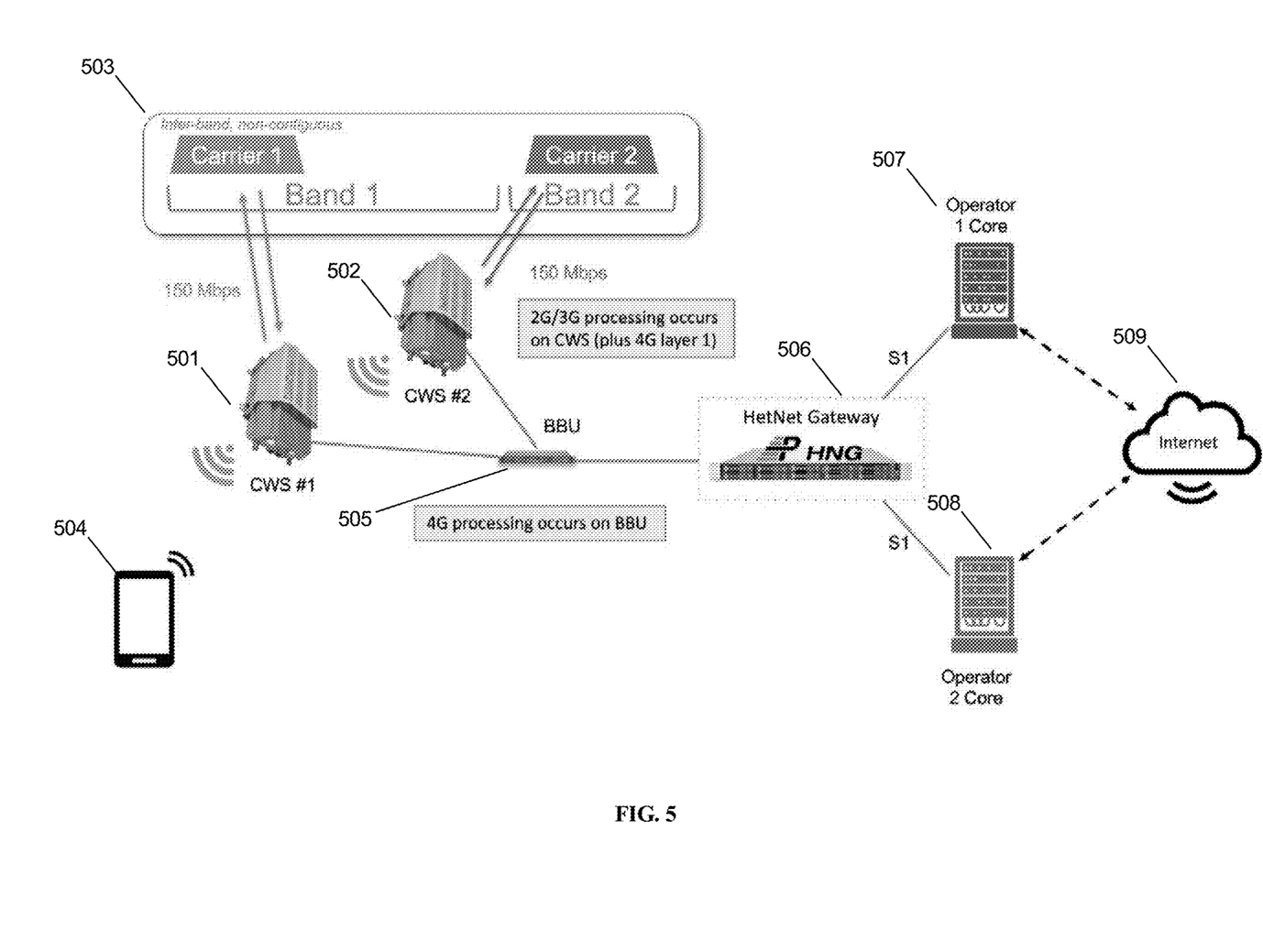
FIG. 5 is a network diagram, in accordance with some embodiments.

As well, MORAN and MOCN are supported well by these scenarios. FIG. 5 is a network diagram in accordance with some embodiments. UE 504 connects to base station 501 or base station 502. The two base stations share a coupling with BBU 505. The BBU 505 is managed and coordinated by HetNet Gateway 506, which is a coordinating server and aggregation server, and also enables multiple core access to Operator 1's core network 507 and Operator 2's core network 508. Via the two core networks, the UE is able to access Internet 509.

As shown, base station 501 uses carrier 1, and base station 502 uses carrier 2, as shown in schematic inset 503. These are both managed by coordinating server 506, in some embodiments, and in other embodiments is coordinated by the base stations directly via X2 or coordination protocol. BBU 505 is connected via CPRI or eCPRI. 4G processing occurs on the BBU, and 2G/3G processing occurs on the base stations themselves at the onboard baseband. In some embodiments, the 4G Layer 1 processing also is performed at the onboard baseband. This enables 2G, 3G, and 4G to all be provided by a single base station in conjunction with BBU 505. Noteworthy is that BBU 505 is capable of providing support in an inter-band, non-contiguous situation. The depicted scenario essentially enables MORAN, multi-operator radio access networks, in which base stations 501 and 502 are both shared between operator 1 and operator 2, accessing different core networks 507 and 508, and using different frequency bands as shown in inset 503, while sharing the same physical hardware 501, 502, 505.

Figure 6:
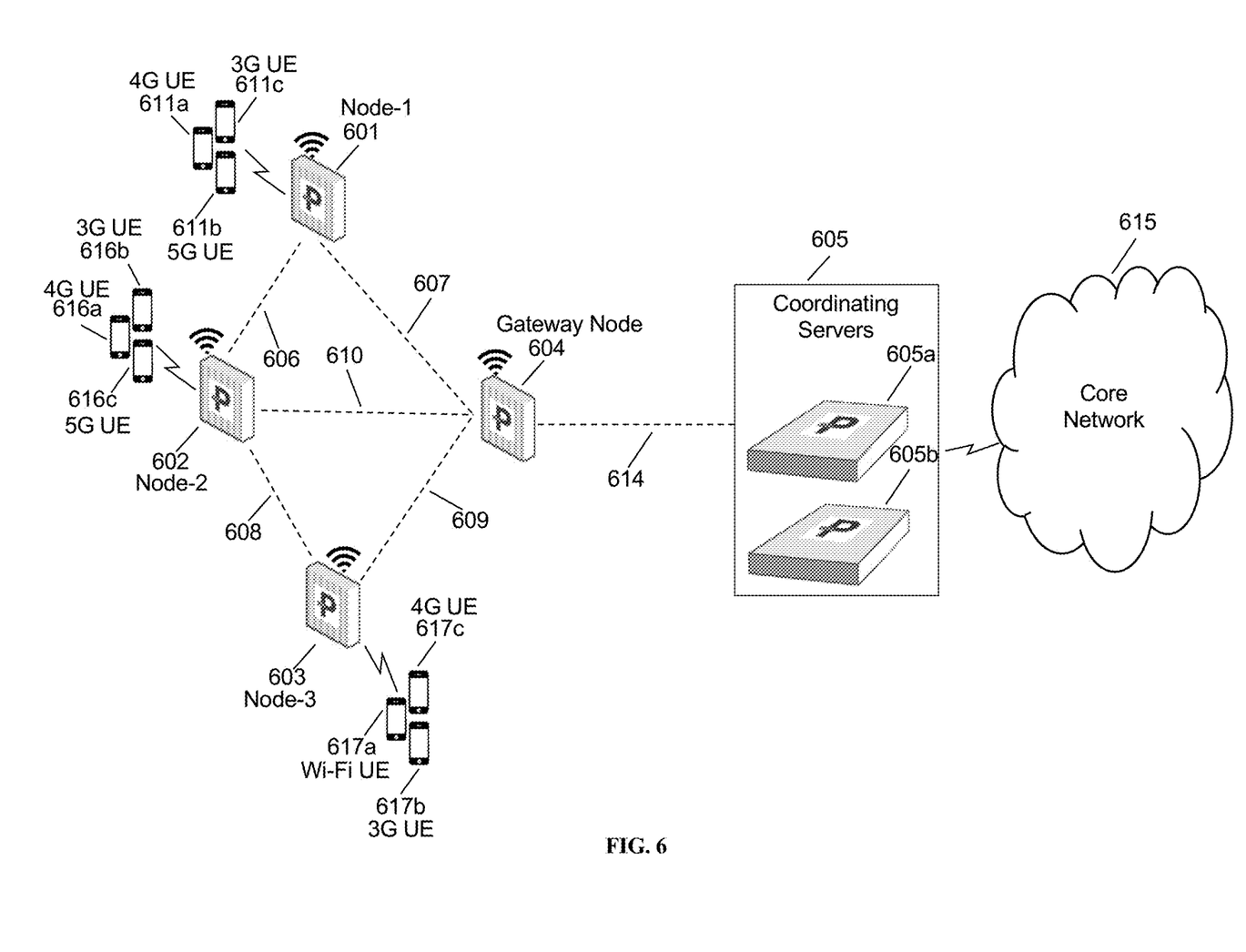
FIG. 6 is a further network diagram, in accordance with some embodiments.

FIG. 6 is a further network diagram in accordance with some embodiments. In some embodiments, as shown in FIG. 6, a base station 1 601, a base station 2 602, and a base station 3 603 are RAN nodes of a conventional type or according to embodiments of the disclosure herein. Base stations 601, 602, and 603 may be mesh nodes and may form a mesh network establishing mesh network links 606, 607, 608, 609, and 610 with a base station 604. The mesh network links are flexible and are used by the mesh nodes to route traffic around congestion within the mesh network as needed. The base station 604 acts as gateway node or mesh gateway node, and provides backhaul connectivity to a core network to the base stations 601, 602, and 603 over backhaul link 614 to a coordinating server(s) 605 and towards core network 615. The base stations 601, 602, 603, 604 may also provide eNodeB, NodeB, Wi-Fi Access Point, Femto Base Station etc. functionality, and may support radio access technologies such as 2G, 3G, 4G, 6G, Wi-Fi etc. The base stations 601, 602, 603 may also be known as mesh network nodes 601, 602, 603.

The coordinating servers 605 are shown as two coordinating servers 605a and 605b. The coordinating servers 605a and 605b may be in load-sharing mode or may be in active-standby mode for high availability. The coordinating servers 605 may be located between a radio access network (RAN) and the core network and may appear as core network to the base stations in a radio access network (RAN) and a single eNodeB to the core network, i.e., may provide virtualization of the base stations towards the core network.

As shown in FIG. 6, various user equipments 611a, 611b, 611c are connected to the base station 601. The base station 601 provides backhaul connectivity to the user equipments 611a, 611b, and 611c connected to it over mesh network links 606, 607, 608, 609, 610 and 614. The user equipments may be mobile devices, mobile phones, personal digital assistant (PDA), tablet, laptop etc. The base station 602 provides backhaul connection to user equipments 612a, 612b, 612c and the base station 603 provides backhaul connection to user equipments 613a, 613b, and 613c. The user equipments 611a, 611b, 611c, 612a, 612b, 612c, 613a, 613b, 613c may support any radio access technology such as 2G, 3G, 4G, 5G, Wi-Fi, WiMAX, LTE, LTE-Advanced etc. supported by the mesh network base stations, and may interwork these technologies to IP.

In some embodiments, depending on the user activity occurring at the user equipments 611a, 611b, 611c, 612a, 612b, 612c, 613a, 613b, and 613c, the uplink 614 may get congested under certain circumstances. As described above, to continue the radio access network running and providing services to the user equipments, the solution requires prioritizing or classifying the traffic based at the base stations 601, 602, 603. The traffic from the base stations 601, 602, and 603 to the core network 615 through the coordinating server 605 flows through an IPSec tunnel terminated at the coordinating server 605. The mesh network nodes 601, 602, and 603 adds IP Option header field to the outermost IP Header (i.e., not to the pre-encapsulated packets). The traffic may from the base station 601 may follow any of the mesh network link path such as 607, 606-610, 606-608-609 to reach to the mesh gateway node 604, according to a mesh network routing protocol.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than SiAP, or the same protocol, could be used, in some embodiments.

Radio access networks, including 2G, 3G, 4G, 5G and Wi-Fi, can be used with the present disclosure. 2G is represented by GERAN, which includes a 2G device, BTS, and BSC. 3G is represented by UTRAN, which includes a 3G UE, nodeB, RNC, and femto gateway (FGW, which in 3GPP namespace is also known as a Home nodeB Gateway or HNBGW). 4G is represented by EUTRAN or E-RAN, which includes an LTE UE and LTE eNodeB. Wi-Fi is represented by Wi-Fi access network, which includes a trusted Wi-Fi access point and an untrusted Wi-Fi access point. The Wi-Fi devices and may access an AP. In the current network architecture, each "G" can have a core network or can share a core network. 2G circuit core network includes a 2G MSC/VLR; 2G/3G packet core network includes an SGSN/GGSN (for EDGE or UMTS packet traffic); 3G circuit core includes a 3G MSC/VLR; 4G circuit core includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP, the SMSC, PCRF, HLR/HSS, Authentication, Authorization, and Accounting server (AAA), and IP Multimedia Subsystem (IMS). An HeMS/AAA is present in some cases for use by the 3G UTRAN. The diagram is used to indicate schematically the basic functions of each network as known to one of skill in the art, and is not intended to be exhaustive. For example, 5G core is shown using a single interface to 5G access, although in some cases 5G access can be supported using dual connectivity or via a non-standalone deployment architecture.

Noteworthy is that the RANs rely on specialized core networks but share essential management databases. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 7:
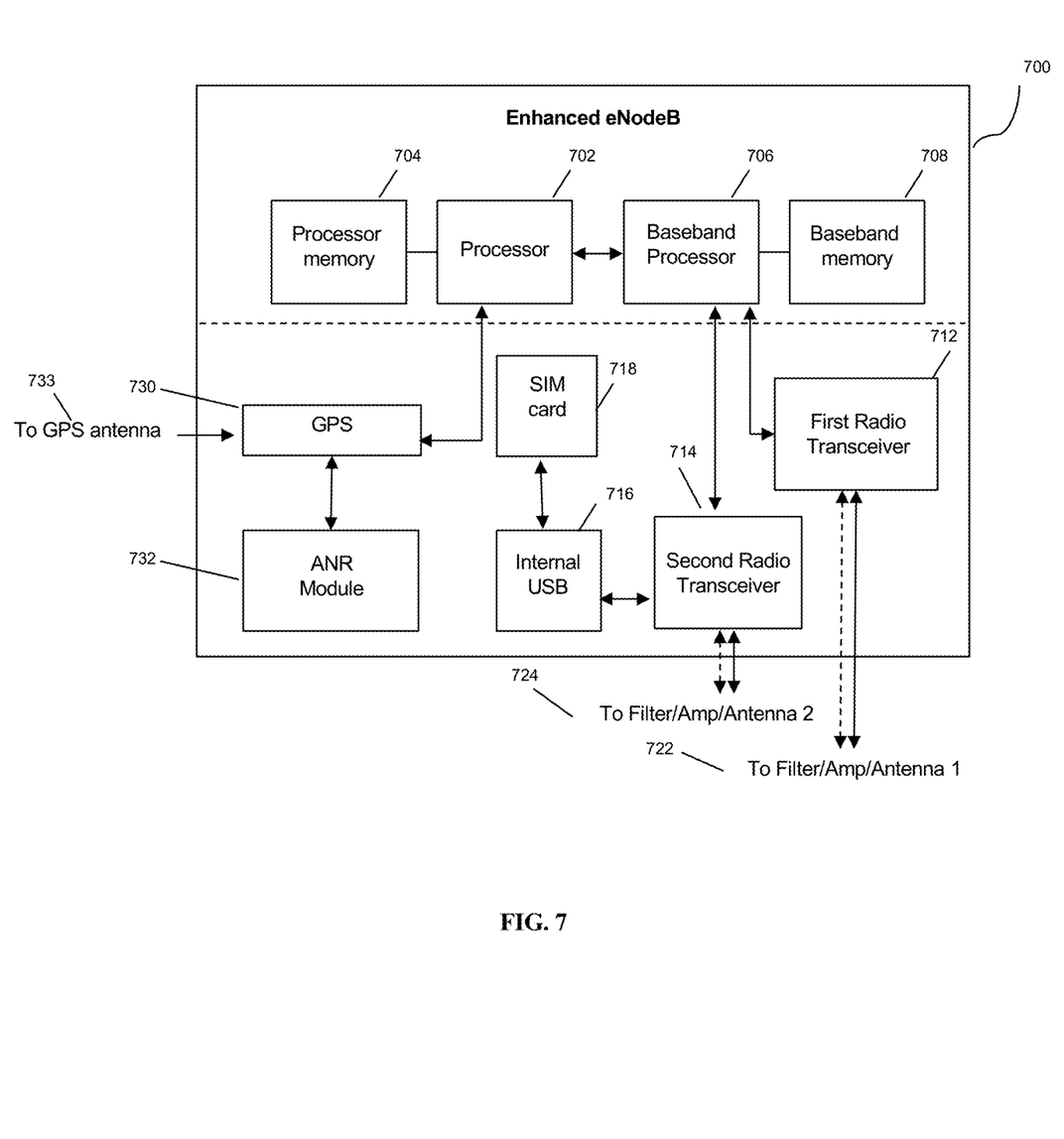
FIG. 7 is an enhanced eNodeB for performing the methods described herein, in accordance with some embodiments.

FIG. 7 is an enhanced eNodeB for performing the methods described herein, in accordance with some embodiments. Mesh network node 700 may include processor 702, processor memory 704 in communication with the processor, baseband processor 706, and baseband processor memory 708 in communication with the baseband processor. Mesh network node 700 may also include first radio transceiver 712 and second radio transceiver 714, internal universal serial bus (USB) port 716, and subscriber information module card (SIM card) 718 coupled to USB port 716. In some embodiments, the second radio transceiver 714 itself may be coupled to USB port 716, and communications from the baseband processor may be passed through USB port 716. The second radio transceiver may be used for wirelessly backhauling eNodeB 700.

Processor 702 and baseband processor 706 are in communication with one another. Processor 702 may perform routing functions, and may determine if/when a switch in network configuration is needed. Baseband processor 706 may generate and receive radio signals for both radio transceivers 712 and 714, based on instructions from processor 702. In some embodiments, processors 702 and 706 may be on the same physical logic board. In other embodiments, they may be on separate logic boards.

Processor 702 may identify the appropriate network configuration, and may perform routing of packets from one network interface to another accordingly. Processor 702 may use memory 704, in particular to store a routing table to be used for routing packets. Baseband processor 706 may perform operations to generate the radio frequency signals for transmission or retransmission by both transceivers 710 and 712. Baseband processor 706 may also perform operations to decode signals received by transceivers 712 and 714. Baseband processor 706 may use memory 708 to perform these tasks.

The first radio transceiver 712 may be a radio transceiver capable of providing LTE eNodeB functionality, and may be capable of higher power and multi-channel OFDMA. The second radio transceiver 714 may be a radio transceiver capable of providing LTE UE functionality. Both transceivers 712 and 714 may be capable of receiving and transmitting on one or more LTE bands. In some embodiments, either or both of transceivers 712 and 714 may be capable of providing both LTE eNodeB and LTE UE functionality. Transceiver 712 may be coupled to processor 702 via a Peripheral Component Interconnect-Express (PCI-E) bus, and/or via a daughtercard. As transceiver 714 is for providing LTE UE functionality, in effect emulating a user equipment, it may be connected via the same or different PCI-E bus, or by a USB bus, and may also be coupled to SIM card 718. First transceiver 712 may be coupled to first radio frequency (RF) chain (filter, amplifier, antenna) 722, and second transceiver 714 may be coupled to second RF chain (filter, amplifier, antenna) 724.

SIM card 718 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 700 is not an ordinary UE but instead is a special UE for providing backhaul to device 700.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 712 and 714, which may be Wi-Fi 802.11a/b/g/n/ac/ad/ah, Wi-Fi 5, Wi-Fi 7, any other Wi-Fi, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 702 for reconfiguration.

A GPS module 730 may also be included, and may be in communication with a GPS antenna 732 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 732 may also be present and may run on processor 702 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 8:
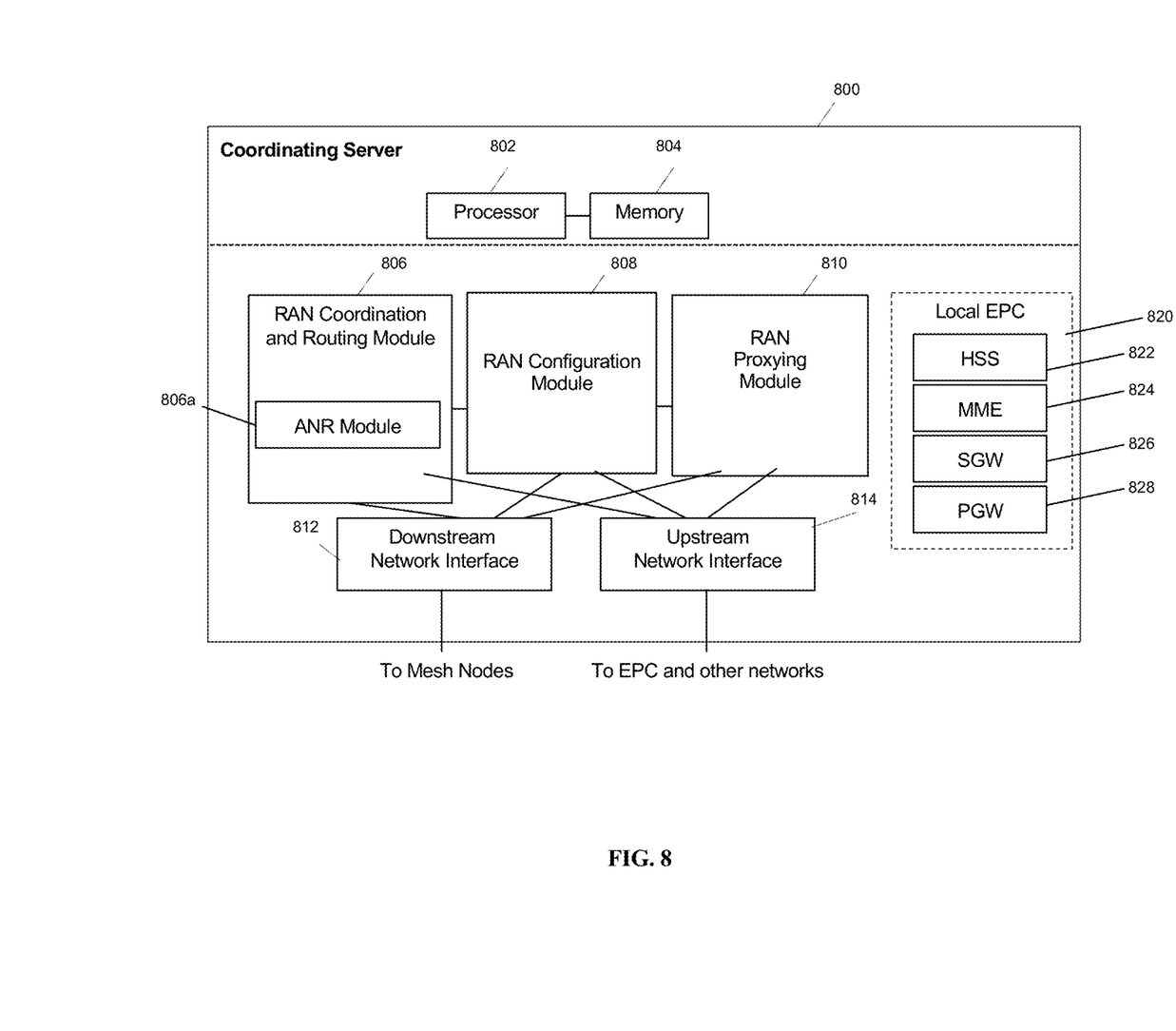
FIG. 8 is a coordinating server for providing services and performing methods as described herein, in accordance with some embodiments.

FIG. 8 is a coordinating server for providing services and performing methods as described herein, in accordance with some embodiments. Coordinating server 800 includes processor 802 and memory 804, which are configured to provide the functions described herein. Also present are radio access network coordination/routing (RAN Coordination and routing) module 806, including ANR module 806a, RAN configuration module 808, and RAN proxying module 810. The ANR module 806a may perform the ANR tracking, PCI disambiguation, ECGI requesting, and GPS coalescing and tracking as described herein, in coordination with RAN coordination module 806 (e.g., for requesting ECGIs, etc.). In some embodiments, coordinating server 800 may coordinate multiple RANs using coordination module 806. In some embodiments, coordination server may also provide proxying, routing virtualization and RAN virtualization, via modules 810 and 808. In some embodiments, a downstream network interface 812 is provided for interfacing with the RANs, which may be a radio interface (e.g., LTE), and an upstream network interface 814 is provided for interfacing with the core network, which may be either a radio interface (e.g., LTE) or a wired interface (e.g., Ethernet).

Coordinator 800 includes local evolved packet core (EPC) module 820, for authenticating users, storing and caching priority profile information, and performing other EPC-dependent functions when no backhaul link is available. Local EPC 820 may include local HSS 822, local MME 824, local SGW 826, and local PGW 828, as well as other modules. Local EPC 820 may incorporate these modules as software modules, processes, or containers. Local EPC 820 may alternatively incorporate these modules as a small number of monolithic software processes. Modules 806, 808, 810 and local EPC 820 may each run on processor 802 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, legacy TDD, or other air interfaces used for mobile telephony.

In some embodiments, the base stations described herein may support Wi-Fi air interfaces, which may include one or more of IEEE 802.11a/b/g/n/ac/af/p/h, Wi-Fi 5, Wi-Fi 6, etc. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. An apparatus for providing base station functionality, remote radio head (RRH) functionality, and both base station and RRH functionality, comprising:
a baseband card;
a radio head, the radio head coupled to the baseband card by way of a first interface, wherein the baseband card shares an enclosure with the radio head; and
a Common Public Radio Interface (CPRI) port configured to couple to an external base band unit (BBU); wherein the radio head is configured to use both a first radio signal from the external BBU and a second radio signal from the baseband card, thereby providing dual base station and RRH functionality.

2. The apparatus of claim 1, wherein a configuration of the apparatus is changed via software or hardware switching such that the apparatus functions as a base station.

3. The apparatus of claim 1, wherein the first radio signal is a 4G radio access technology (RAT) signal, and the second radio signal is a 2G RAT signal.

4. The apparatus of claim 1, wherein autodetect is used to determine which frames are from the baseband card and which frames are from the external BBU coupled to the CPRI port, and wherein different frames are sent to different targets.

5. The apparatus of claim 2, wherein the apparatus includes local baseband capability and runs a multi-RAT architecture.

6. The apparatus of claim 1, wherein a configuration of the apparatus is changed via software or hardware switching such that the apparatus performs as a pure remote radio head and does not provide base station functionality.

7. The apparatus of claim 1, wherein the apparatus is a multi-RAT apparatus and provides at least one of remote radio head functionality or base station functionality for each RAT.

8. A method for providing base station functionality, Remote Radio Head (RRH) functionality, and both base station and RRH functionality in an apparatus, comprising:
providing a baseband card;
providing a radio head, the radio head coupled to the baseband card by way of a first interface, wherein the baseband card shares an enclosure with the radio head; and
providing a Common Public Radio Interface (CPRI) port configured to couple to an external baseband unit (BBU);
configuring the radio head to use both a first radio signal from the external BBU and a second radio signal from the baseband card, thereby providing dual base station and RRH functionality.

9. The method of claim 8, further comprising changing a configuration of the apparatus via software or hardware switching such that the apparatus functions as a base station.

10. The method of claim 8, wherein the first radio signal is a 4G radio access technology (RAT) signal, and the second radio signal is a 2G RAT signal.

11. The method of claim 8, further comprising:
using autodetect to determine which frames are from the baseband card and which frames are from the external BBU coupled to the CPRI port; and
sending the different frames to different targets.

12. The method of claim 9, wherein the apparatus includes local baseband capability and runs a multi-RAT architecture.

13. The method of claim 8, further comprising changing a configuration of the apparatus via software or hardware switching such that the apparatus performs as a pure remote radio head and not providing base station functionality.

14. The method of claim 8, wherein the apparatus is a multi-RAT apparatus; and
further comprising providing by the apparatus at least one of remote radio head functionality or base station functionality for each RAT.

15. A non-transitory computer-readable medium containing instructions for providing base station functionality, Remote Radio Head (RRH) functionality, and both base station and RRH functionality in an apparatus, which, when executed, cause the apparatus to perform steps comprising:
configuring a baseband card of the apparatus;
configuring a Common Public Radio Interface (CPRI) port of the apparatus to couple to a baseband unit (BBU) external from the apparatus; and
configuring a radio head of the apparatus to use both a first radio signal from the BBU external from the apparatus and a second radio signal from the baseband card, thereby providing dual base station and RRH functionality,
wherein the baseband card shares an enclosure with the radio head.

16. The non-transitory computer-readable medium of claim 15, further comprising instructions, which when executed, cause the apparatus to change a configuration via software or hardware switching such that the apparatus functions as a base station.

17. The non-transitory computer-readable medium of claim 15, wherein the first radio signal is a 4G radio access technology (RAT) signal, and the second radio signal is a 2G RAT signal.

18. The non-transitory computer-readable medium of claim 15, further comprising instructions, which when executed, cause the apparatus to:
use autodetect to determine which frames are from the baseband card and which frames are from the BBU, external from the apparatus, coupled to the CPRI interface; and send different frames to different targets according to the autodetected determination.

19. The non-transitory computer-readable medium of claim 16, wherein the apparatus includes local baseband capability and runs a multi-RAT architecture.

20. The non-transitory computer-readable medium of claim 15, further comprising instructions, which when executed, cause the apparatus to change a configuration of the apparatus via software or hardware switching such that the apparatus performs as a pure remote radio head and does not provide base station functionality.

\* \* \* \* \*